Patented June 9, 1942

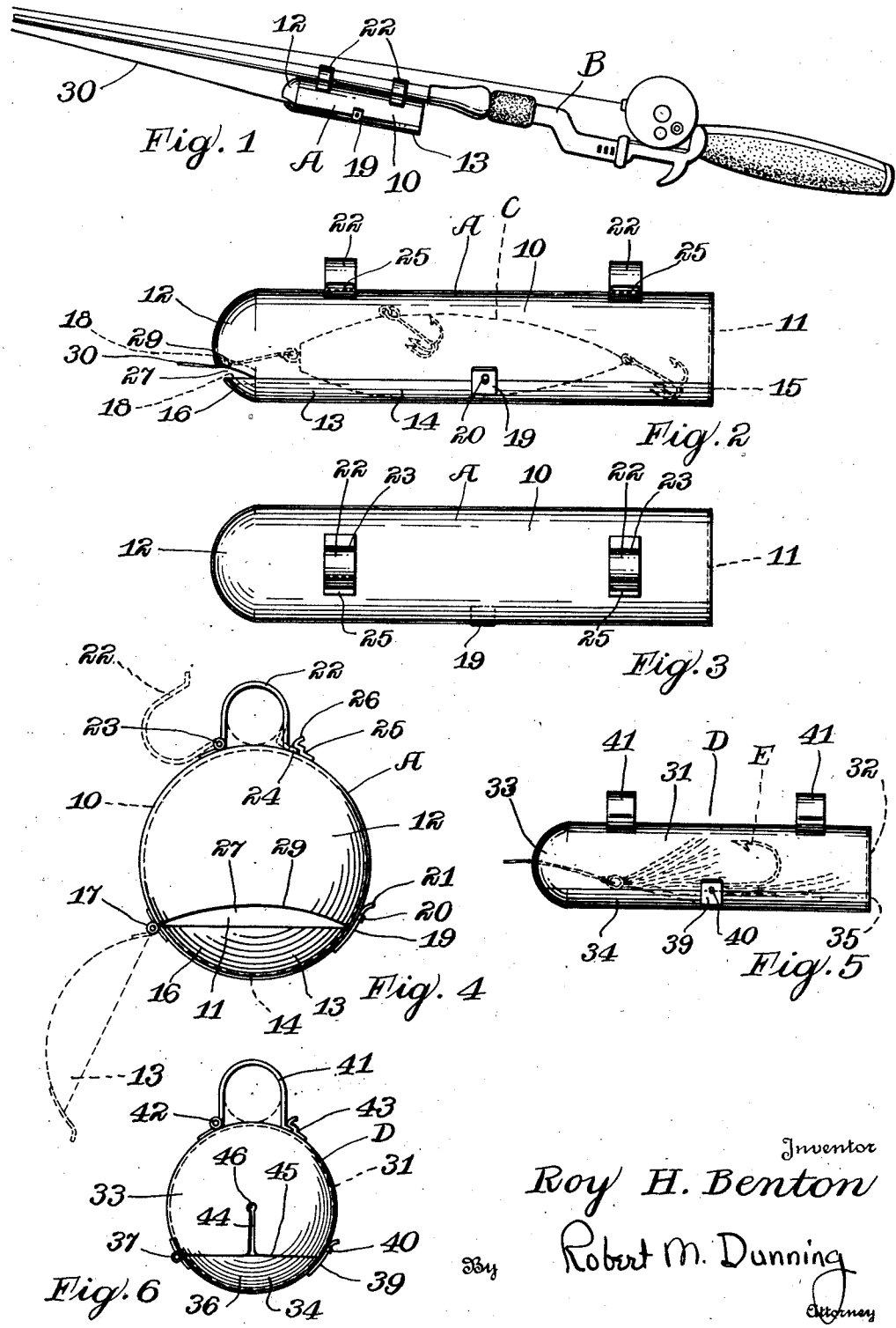

2,285,888

UNITED STATES PATENT OFFICE 2,285,888

BAIT RETAINER

Roy H. Benton, South St. Paul, Minn.

Application January 9, 1941, Serial No. 373,760

7 Claims. (Cl. 43—25)

My invention relates to an improvement in bait retainer, and deals more particularly with a holder or container for casting plugs, trout flies and other lures, which holder or container is secured to a casting rod or fly rod.

Fish hooks of the types usually used upon plugs, flies and lures are difficult to remove from objects in which they become entangled. Serious injury sometimes results when such hooks become embedded in the flesh of an individual, and often much time is wasted in detaching the hooks from clothing or other matter in which the hooks become accidentally engaged. Furthermore, damage to the hooks and lures often follows when such hooks or lures rest upon the bottom of a boat or upon a dock where they can be readily crushed.

It is the object of the present invention to provide a holder or container for casting plugs, flies, or other lures, which is secured directly to the casting rod or fly rod. This container is so designed as to cause no interference with the usual operation of the rod. When the bait or lure is not in use, it is enclosed in this container or holder where it can cause no injury, and cannot itself become damaged. The retainer is of particular value when used for plugs, flies, or lures, in which the hooks are inseparably secured thereto, or may be used to contain bait used in deep sea fishing.

It is an object of my invention to provide a holder or retainer which will hold the lure concealed when not in use to prevent the same from becoming entangled in brush, weeds, or other matter when the individual is in motion. My retainer is preferably constructed of metal of sufficient strength to withstand rough usage, and so that it will not easily bend or become damaged. With such a construction, my device is simple and durable, reliable and efficient, and may be manufactured inexpensively.

It is a feature of my invention that my retainer may be made of various sizes suitable for different types of plugs, lures, or flies. Thus my retainer may be smaller when used in containing trout flies, and may be of larger size when casting plugs or other lures of this type are to be contained. Thus on light fly rods the retainer may be made smaller than would ordinarily be used on casting rods and rods of similar construction. The body of my retainer may either be round or oval in shape, or may be made of a shape suitable for a predetermined type of lure.

It is an important feature of my invention to provide a retainer with a closure which extends substantially the length of the retainer body for easy insertion and removal of the lure; and to provide an end on the closure which cooperates with a recess or aperture in the end of the retainer body in a manner to prevent damage to the line or leader attached to the lure. When the retainer is designed to contain casting plugs or similar lures, this aperture in the end of the retainer body extends the full width of the cooperating wall of the closure, so that the line or leader cannot become pinched between the closure and the retainer body as the closure is pivoted into closed position.

It is a further feature of my invention that the aperture in the end of the retainer body may be in the nature of a slot into which the line or leader may extend when the retainer is designed for use to support trout flies or other small lures. The end of this slot communicates with the opening in the end wall normally closed by the end wall of the closure when the same is in closed position. When the line or leader is in this slot, it cannot be pinched by the closure as the same is pivoted into closed position.

These and other objects and novel features of my invention will be more clearly and fully set forth in the following specification and claims.

In the drawing forming a part of my specification:

Figure 1 is a side elevation view of my bait retainer in use upon a fishing rod.

Figure 2 is a detail side elevation view of my bait retainer alone, in closed position.

Figure 3 is a top plan view of the retainer illustrated in Figures 1 and 2 of the drawing.

Figure 4 is an enlarged end view of the retainer, showing in full lines the closure in closed position and the clamps in engaged position; and showing in dotted outline the open positions of the closure and attaching clamps.

Figure 5 is a side elevation view of my bait retainer designed particularly for containing trout flies and other small lures.

Figure 6 is an end view of the retainer illustrated in Figure 5 of the drawing.

The retainer A is secured to the fishing pole or rod B in the manner best illustrated in Figure 1 of the drawing. The retainer A comprises an elongated tubular body 10 of sheet metal or other suitable material. This body may be cylindrical in shape, as shown, or may be oval in cross section, its depth being slightly greater than its width.

The retainer A is provided with a closed rear end 11, and a closed front end 12. The closed front end 12 is preferably rounded outwardly, as illustrated in the drawing. The body is split longitudinally on a plane parallel to the longitudinal axis of the body 10, to provide a closure 13. This closure 13 is provided wth a side wall portion 14 forming a part of the tubular body 10 when the closure is in closed position. The end wall portion 15 of the closure complements the end wall 11 to provide a complete closure for the rear end of the retainer. The front end wall portion 16 complements the front end 12 on the body 10. The surfaces of this opening are provided with a beaded edge 18 in order to prevent damage to or friction upon the line as the rod is carried from place to place.

The closure 13 is pivotally hinged at 17 to the body 10 on a line parallel to the longitudinal axis of the body 10. A spring finger or catch 19 is secured to the closure 13 between the ends thereof. An aperture in the finger 19 receives a lug 20 on the body 10 to hold the closure 13 normally closed. The end 21 of the spring catch 19 is bent outwardly to act as a cam to flex the finger 19 as the closure is pivoted into closed position, and to provide a finger engaging portion by means of which the catch 19 may be disengaged from the lug 20.

A pair of longitudinally aligned spring loops 22 are hinged by aligned pivots 23 to the top of the container body 10. Flanges 24 on these spring loops 22 engage in catches 25 on the body 10. Arcuated guides 26 on the catches 25 guide the flanges 24 into latched position as the loops 22 are pivoted toward the body 10. The loops may be flexed inwardly to release the flanges from the catches 25 when it is desired to swing the loops 22 into the open position illustrated in dotted outline in Figure 4 of the drawing.

A recess 27, preferably arcuated in shape, is provided in the edge 29 of the front end wall 12 of the body 10. This recess 27 preferably extends throughout the length of the edge 29. The recess 27 is designed to accommodate the line or leader attached to the plug or lure C, and prevents the line 30 from being pinched between the front end wall portion 16 of the closure 13, and the front end wall 12 of the body 10.

The bait retainer D illustrated in Figures 5 and 6 of the drawing is similar in form to the retainer A previously described, with the exception of the forward end of the body. This retainer D is preferably of smaller size than the retainer A, and is designed for the accommodation of trout flies E or other small lures.

The retainer D is provided with a container body 31 which is elongated and tubular in form. It is provided with a closed rear end 32 and an outwardly rounded front end 33. The closure 34 is formed by splitting the body along a plane parallel to the longitudinal axis of the body; the end wall 35 thereof complementing the end wall 32 of the body and the forward end wall 36 thereof complementing the front wall 33 of the closure bearing body 31. The closure 34 is pivoted at 37 to the body 31, and is held in closed position by a spring clip or finger 39 similar to the clip 19 which engages a lug 40 on the body 31.

Loops 41 are pivoted by aligned pivots 42 to the body 31. These loops 41 are retained by catches 43 on the body. A slot 44, extending radially inward from the edge 45 of the front and closure 33 terminates in a slight enlargement 46. The line or leader from the fly E extends through this slot 44 which is of such size that the fly E will not pass through.

The manner in which the bait, lure, or fly may be inserted and removed from the retainers is believed obvious from an examination of the drawing. The elongated closures permit easy insertion and removal of the bait or lure.

In accordance with the patent statutes, I have described the principles of construction and operation of my bait retainer, and while I have endeavored to set forth the best embodiments thereto, I desire to have it understood that obvious changes may be made within the scope of the following claims without departing from the spirit of my invention.

I claim:

1. A bait retainer comprising an elongated tubular body having closed ends and longitudinally split along a plane substantially parallel to the longitudinal axis of said body, the parts of said body being pivotally connected together along a line parallel to the axis of said tubular body, longitudinally spaced clamp means on said body, and means for securing said parts of said body in tubular relation, one of said closed ends including aperture means in communication with the edge of said closed one end between said body parts.

2. A bait retainer for fishing poles comprising an elongated tubular body split along a plane substantially parallel to the longitudinal axis of said body, forming a main body portion and a closure; means pivotally connecting said main body portion and said closure together, means on said body for attaching said body to a fishing pole, and closed ends on said body; portions of said closed ends being connected to said main body portion, and corresponding portions on said closed ends being connected to said closure, the respective closed end portions being arranged in abutting relation; and one of said closed end portions on said main body portion having recess means therein communicating with said abutting edge thereof.

3. A bait retainer for fishing poles comprising an elongated tubular body having closed ends, said body being split on a plane parallel to the longitudinal axis of said body to form a main body portion and a closure portion having abutting edges; means pivotally connecting said closure portion to said main body portion, clamp means on said main body portion for securing said bait retainer to a fishing pole, and means normally retaining said closure in closed position; said closed end at one end of said body having a recess therein communicating with its abutting edge.

4. A bait retainer for fishing poles comprising an elongated tubular container, said container having an elongated opening therein, a closure for said opening pivotally connected to said container, latch means for retaining said closure in closed position, closed ends in said container, a recess in one of said closed ends communicating with said elongated opening, and means on said container for securing the same to a fishing pole.

5. A bait retainer for fishing poles comprising an elongated tubular container, said container having an opening therein, a closure for said opening, a recess in said container communicating with said opening through which a line may pass when said closure is closed, and means for securing said closure pivotally to said container, and said container having means thereon for clamping said container to a fishing pole.

6. A bait retainer for fishing poles comprising an elongated tubular container having closed ends, and split longitudinally to provide a main body portion and a closure portion in abutting relation, means for securing said container to a fishing pole, and means pivotally connecting said closure portion to said main body portion, one of said closed ends having a recess therein extending throughout the length of the said abutting edge of said one closed end.

7. A bait retainer for fishing poles comprising an elongated tubular body having closed ends, and split longitudinally to provide a main body portion and a closure portion in abutting relation, means for securing said body to a fishing pole, and means pivotally connecting said closure portion to said main body portion, one of said closed ends having a radially extending slot therein extending from the abutting edge of said one closed end of said main body portion to a point adjacent the center of said one closed end.

ROY H. BENTON.